(12) United States Patent  (10) Patent No.: US 6,694,999 B2
Hettinger  (45) Date of Patent: Feb. 24, 2004

(54) SYSTEMS FOR WELL GAS COLLECTION AND PROCESSING

(75) Inventor: Mark D. Hettinger, Gillette, WY (US)

(73) Assignee: Hettinger Welding, Inc., Gillette, WY (US)

( * ) Notice: Subject to any disclaimer, the term of this patent is extended or adjusted under 35 U.S.C. 154(b) by 7 days.

(21) Appl. No.: 10/010,420

(22) Filed: Dec. 7, 2001

(65) Prior Publication Data

US 2003/0106585 A1 Jun. 12, 2003

(51) Int. Cl.[7] ............................................. B01D 17/025
(52) U.S. Cl. ...................... 137/171; 55/419; 137/203
(58) Field of Search ............................ 55/419; 137/171, 137/203

(56) References Cited

U.S. PATENT DOCUMENTS

| | | | |
|---|---|---|---|
| 3,789,588 A | | 2/1974 | Laubli ........................ 55/419 |
| 3,997,303 A | * | 12/1976 | Newton ....................... 55/419 |
| 4,650,503 A | * | 3/1987 | Juzi ............................ 55/419 |
| 6,119,711 A | | 9/2000 | Dougherty .................. 137/171 |

OTHER PUBLICATIONS

Photographs of prior art header system cited as "Other" document in U.S. Patent No. 6,119,711 to Dougherty (1 sheet).*

* cited by examiner

Primary Examiner—Gerald A. Michalsky
(74) Attorney, Agent, or Firm—Santangelo Law Offices, P.C.

(57) ABSTRACT

Well gas collection systems and methods for improved efficiency, structural integrity, and convenient application provide a multiple well header system, a header element with upper and lower ends and a plurality of inlets in fluidic communication with the interior chamber through a sidewall and a gas outlet positioned through the header element in fluidic communication with the interior chamber wherein each inlet pipe comprises a merged fluidic flow path in fluidic communication with the interior chamber arranged to provide optimal collection of produced gas from wells.

10 Claims, 12 Drawing Sheets

SYSTEMS FOR WELL GAS COLLECTION AND PROCESSING

BACKGROUND OF THE INVENTION

This invention relates generally to the field of well production and the collection and processing of well fluids. Specifically, it relates to fluid collection systems to achieve the collection of produced gas from wells, which may be especially applicable to collection systems for methane gas. More particularly, the invention may relate to well gas collection systems for a plurality of wells, facilitating the flow and merging of gas from multiple well sources, directing entry of fluid into the collection system, and the processing of produced fluids into liquid and gas phases, potentially for subsequent collection and processing. The invention may be particularly applicable for well header systems, potentially relative to resource recovery for oil and gas, coal, and landfill applications.

The technology of the collection and processing of well fluids has undergone many conceptual changes, especially in the industries of resource recovery such as the oil and gas industries and the coal industry. The collection of gas as the primary or target resource or as a secondary or by-product of other resource development has increasingly become important in various fuel-dependent markets. The collection of gas has further served to address environmental concerns arising from the direct or indirect production of gas, especially in developing areas such as coal production and landfill operations.

Fluid collection systems for many of these operations have historically taken a variety of forms dependent upon, generally, the resource to be collected, and the nature of the subsequent processing or the use to which the collected resource is to be applied. Traditional forms of fluid collection systems may have incorporated elements from various fields, such as header systems, fluid inlets and outlets and the corresponding piping thereof, or the like, with varying results.

The coal industry in particular has utilized and developed gas collection systems for the collection and subsequent separation of produced well fluids. Wells may be installed in the respective coal field and may serve several purposes. The wells may be set for the primary purpose of producing methane gas. The methane gas may also be collected as a secondary or by-product result of coal production. The methane gas that can naturally occur within a coal field could be considered detrimental to the environment, especially as a contributor to the reduction in ozone layer, among other effects, particularly during the commercial development of the field. Additionally, a build-up of methane gas as a result of coal production may create health and general safety hazards to the surrounding environment and populous.

Raw methane gas produced from such wells may typically include water vapor entrained within the produced fluid. Water vapor may impair or serve as a detriment to the subsequent processing and transportation of methane gas. A need, therefore, exists for the collection of the produced methane gas and the separation of the gas from entrained water vapor.

Typical designs of collection systems in the coal industry may include header systems for the collection of produced well fluids from coal beds. Past attempts for the design of header systems for the collection of methane gas may have particularly provided a cylindrical header disposed at a particular configuration relative to ground surface. One such design may even provide a header disposed at a forty-five degree angle from the ground surface. Fluid production pipes from separate wells may connect the coal bed wells to the header, thereby providing a flow path from the producing wells to the header. Fluid from each well may enter the header through the respective production pipe and may separate in the header potentially due at least in part to the angled configuration of the header and the force of gravity upon the water vapor as the produced well fluid collects in the header. Water vapor entrained in gas from the wells may collect at the bottom of the header while methane gas separated from the water vapor may rise to an upper portion thereof. The separated gas can be subsequently transported, stored or processed accordingly. However, past attempts at methane collection and processing may have suffered from a lack of fully efficient water vapor separation, potentially at the initial step of fluid entry and collection in the header. Water vapor in past systems may not have adequately and appreciably separated from the collected methane gas. The collected gas may not be easily transported or processed due to the content of water vapor remaining entrained with the collected gas. A particular need existed, therefore, for collection systems that served more efficient gas separation roles than past attempts.

One attempt to increase the efficiency of systems collecting methane coal gas from multiple wells may have been disclosed in U.S. Pat. No. 6,119,711 issued to Dougherty, hereby incorporated by reference. The system of U.S. Pat. No. 6,119,711 may provide a header system providing pipes each leading from separate wells and mounted to a header. The pipes may be directly welded to the header and may be welded at an orientation divergent or transverse to the central portion or axis of the header or a radius thereof. The system may further provide the header in an upright orientation and a paired orientation of pipes each leading into one side of the header. The pipes may be arranged in a plurality of horizontal pairs so as to introduce gas from each pipe into the header. The gas may then flow into the opposite side of the header and may even provide individual fluid flows from each pipe to flow into a corresponding flow from the second of the paired pipes to potentially achieve some amount of gas and water vapor separation within the header, potentially in conjunction with a baffle plate. The system of U.S. Pat. No. 6,119,711, however, may suffer from several drawbacks that may ultimately affect the efficiency, structural integrity and convenience of the system.

One drawback of the header system of U.S. Pat. No. 6,119,711 concerns the potential efficiency of gas separation from entrained water vapor. The header system may rely upon the paired flow of gases from paired pipes to not only flow into an opposite side of the header, but for each flow from each pipe to potentially flow into the corresponding paired pipe flow to achieve some water vapor separation. The potential reliance upon paired flows of gas could affect the efficiency of the system, for example in potentially uneven flow environments between and among various wells, potentially as between paired pipes, and may produce an unintended, mechanically cumbersome design. Such attempt, therefore, may have failed to address the efficiency concerns identified in previous attempts at methane gas collection.

Furthermore, a particular need may exist in the field of methane coal gas collection for systems that are structurally and configurationally acceptable for field applications. The system of U.S. Pat. No. 6,119,711 may not have addressed potential structural and design limitations that may be commonplace in methane coal gas collection. Current header systems may typically provide a welded connection between pipes and the header. The type and configuration of the weld between pipes and the header may, in part, determine the structural integrity of the pipes and header, and potentially that of the entire system. U.S. Pat. No. 6,119,711 provides piping mounted to the header and a welded connection between the pipes and the header. The configuration of the pipes with respect to the header provide a pipe configuration divergent or transverse from the central portion or axis of the cylindrical header or a radius thereof. This type of pipe and header configuration may provide a mounting of the pipe that is less structurally robust than other potential configurations. Furthermore, the pipe and header configuration and resulting mounting may detrimentally affect the structural integrity of the header itself, as a larger inlet may be needed to accommodate the configuration and entry of the pipe. The gas pressures within the system may create a breach in the structural integrity of the pipe mounting. Well pressures at the inlet of typical header systems for methane coal gas collection may be 90 lbs. per square inch or more. Furthermore, current methane coal gas collection systems may potentially include compressors or other mechanical means of drawing well fluid through the collection system, typically inducing about 5 lbs. per square inch or more of pull on the system. The added pressure changes and resulting stress on the collection system may create a cracking or other like stress effects on the pipe-to-header mounting, especially for welded connections, or in the header itself that may detrimentally impair system integrity.

U.S. Pat. No. 6,119,711, while attempting to address gas separation efficiency characteristics potentially lacking in previous systems, may not have otherwise addressed potential system configurations desirable in the field. One example of the typical constraints on methane coal gas collection systems are the structures that may house the collection systems at the collection site. These structures may provide an efficient and protective enclosure for the system. The structure for the system may, however, potentially limit possible configurations for the collection system, particularly with regard to pipe and header configurations. Therefore, a long felt but unsatisfied need may have existed for gas collection systems having configurations suitable for particular collection cites while providing structural and efficiency characteristics lacking in previous gas collection systems. The system of U.S. Pat. No. 6,119,711, developed to potentially address the gas separation inefficiencies of previous systems, may actually teach away from the desired characteristics of a structurally and configurationally acceptable collection system.

Other attempts in various fields have produced a wide range of systems of gas collection. Previous attempts in various fields may be found in U.S. Pat. No. 3,789,588, issued to Laubli, U.S. Pat. Nos. 5,882,383, 5,753,013 and 5,554,209 issued to Dingfelder, U.S. Pat. No. 5,775,442 issued to Speed, U.S. Pat. No. 4,369,049 issued to Heath, U.S. Pat. No. 4,268,277 issued to Rooker, U.S. Pat. No. 4,214,883 issued to Raseley et al., U.S. Pat. No. 3,957,465 issued to Pircon, U.S. Pat. No. 3,877,904 issued to Lowrie, U.S. Pat. No. 3,331,188 issued to Sinex, U.S. Pat. No. 3,303,621 issued to Hill, U.S. Pat. No. 2,157,829 issued to Metzgar, and 864,158 issued to De Lany, each hereby incorporated by reference. However, each of these attempts may suffer, generally, from various deficiencies in separation efficiency, structural integrity and configuration desirability that may have been previously identified in the field of gas collection, especially for methane coal gas applications, and may have been developed without the particular needs and desired characteristics being considered for methane coal gas applications, generally. Many of the characteristics desirable for methane coal gas collection may have been theretofore unforeseen by those in the various fields.

SUMMARY OF THE INVENTION

The present invention is designed to address the potential problems associated with conventional gas collection systems. Accordingly, embodiments of the present invention may provide for well gas collection systems and methods of well gas collection that may address inadequacies of previous techniques. The invention may comprise, according to particular embodiments, a well gas collection system and methods of well gas collection whereby efficiency, structural integrity, and convenient application of the system may be more easily and adequately accomplished. The invention may comprise, in preferred embodiments, a well gas collection system and methods of well gas collection whereby the system may be accomplished with adequate gas separation efficiency, while retaining structural integrity and providing for convenient system configurations for field applications, particularly with regard to methane coal gas applications.

In addition, embodiments of the present invention may provide for gas collection systems directed to the collection of well gas from a plurality of wells, and in preferred embodiments, systems directed to well gas collection from a plurality of wells producing from coal beds. Embodiments may provide for applications directed to providing the merging of fluid flow into a gas collection element and inlets comprising merged fluidic flow paths to a collection element. Further, the present invention may comprise embodiments particularly directed to applications of gas separation incorporating various gas separation elements, potentially including baffle applications, among others. Particular embodiments may provide a baffle element equally responsive to inlets of a gas collection element and at least partially obstructing well fluid flowing into the gas collection element. The embodiments of the present invention may further provide for the flowing of well fluid substantially radially into a gas collection element of the system and inlet elements substantially coincident with a radius of the gas collection element. Embodiments of the present invention, therefore, may be considered developments away from previous efforts of well gas collection systems and methods of well gas collection, both generally and as more particularly described below.

In accordance with preferred embodiments, the present invention may provide a multiple well header system, comprising a header element having an upper end and a lower end and a sidewall connecting the upper end and the lower end, wherein the upper and lower ends and the sidewall form an interior chamber of the header element; a plurality of inlets in fluidic communication with the interior chamber through the sidewall; a plurality of inlet pipes each fluidically connected to one of the inlets and in fluidic communication with the interior chamber; a plurality of gas source pipes each fluidically connected to one of the inlet pipes and in fluidic communication with the interior chamber; and a gas outlet positioned through the header element in fluidic communication with the interior chamber; wherein each inlet pipe comprises a merged fluidic flow path in fluidic communication with the interior chamber.

Additional preferred embodiments of the present invention may further provide a multiple well header system, comprising a header element having an upper end and a lower end and a sidewall connecting the upper end and the lower end, wherein the upper and lower ends and the sidewall form an interior chamber of the header element; a plurality of inlets in fluidic communication with the interior chamber through the sidewall; a plurality of inlet pipes each fluidically connected to one of the inlets and in fluidic communication with the interior chamber, wherein a longitudinal axis of each inlet pipe is substantially coincident with a radius of the header element; a plurality of gas source pipes each fluidically connected to one of the inlet pipes and in fluidic communication with the interior chamber; and a gas outlet positioned through the header element in fluidic communication with the interior chamber.

Preferred embodiments may also provide a multiple well header system, comprising a header element having an upper end and a lower end and a sidewall connecting the upper end and the lower end, wherein the upper and lower ends and the sidewall form an interior chamber of the header element; a plurality of inlets positioned through the sidewall and in fluidic communication with the interior chamber; a baffle element within the interior chamber positioned in an orientation corresponding to the plurality of inlets wherein the baffle element is equally responsive to the inlets; a plurality of inlet pipes, each inlet pipe in fluidic communication with the interior chamber through fluidic connection to one of the plurality of inlets; a plurality of gas source pipes each fluidically connected to one of the inlet pipes; and a gas outlet positioned through a upper end of the header in fluidic communication with the interior chamber.

One object of the present invention, therefore, is to provide well gas collection systems, in various embodiments, employing desirable characteristics such as efficiency of gas separation, and in accordance with preferred objects of the invention, efficiency for gas separation in methane coal gas applications. Therefore, one goal of the present invention is to provide a well gas collection system that may achieve desirable levels of gas separation efficiency without sacrificing other desirable aspects of the present invention. One particular goal of the present invention, therefore, is the provision of a well gas collection system that incorporates novel features to accomplish levels of efficiency long identified as needed in methane coal gas collection but potentially heretofore inadequately addressed in the respective field.

Another object of the present invention is to provide well gas collection systems, in various embodiments, utilizing configurations and techniques that may achieve desired levels of structural integrity, and in accordance with preferred objects of the invention, levels of structural integrity in methane coal gas applications. A goal of the present invention, therefore, is to provide well gas collection systems incorporating robust configurations and techniques that may achieve greater levels of structural integrity as compared to conventional well gas collection systems. Another goal, therefore, is to provide well gas collection system configurations that allow for minimal cracking or other stress effects, or the like, of the system to achieve system integrity. Additionally, another goal of the present invention is to provide, in particular embodiments, well gas collection systems having configurations allowing for pipe-to-header connections, and, among others, in preferred embodiments, pipe-to-header welds and header thicknesses that provide structural system integrity, or the like, during well gas collection.

Furthermore, an object of the invention is to provide well gas collection systems, in various embodiments, allowing for convenient application of the system, and in accordance with preferred objects of the invention, levels of desirable convenience in methane coal gas applications. One goal of the present invention, therefore, is directed to system configurations and techniques that may be directed to particular field applications, and, among others, in accordance with preferred embodiments of the present invention, methane coal gas applications.

Other objects of the invention are disclosed throughout other areas of the specification and claims. In addition, the goals and objectives may apply either in dependent or independent fashion to a variety of other goals and objectives in a variety of embodiments. Additionally, the description and drawings that follow highlight the recited objectives and goals mentioned above, describing and depicting several embodiments of the present invention.

BRIEF DESCRIPTION OF THE DRAWINGS

FIG. 4a is a top perspective view of the embodiment depicted in FIG. 3a.

FIG. 6 is a side perspective view of an alternative embodiment of that depicted in FIG. 3a.

DETAILED DESCRIPTION OF PREFERRED EMBODIMENTS

The basic concepts of the invention may be embodied in many different ways. The inventive concept may involve the materials, elements, apparatus, device and methods for multiple well gas collection systems and methods of well gas collection, and in preferred embodiments, multiple well gas header systems, and gas collection generally.

As should be understood, the present invention includes a variety of aspects that may be used in various combinations.

The invention is intended to encompass a variety of embodiments of well gas collection systems and header systems, and combinations thereof, as may be particularly described and depicted herein. It may involve both methods and devices to accomplish the various aspects explained. In addition, while some methods and devices are disclosed, it should be understood that these may be varied. Importantly, as to all of the foregoing, all aspects should be understood to be encompassed by this patent both independently and in combination as set forth in the claims now or later issued, in both this and in subsequent continuing applications, if any.

Figure 1:
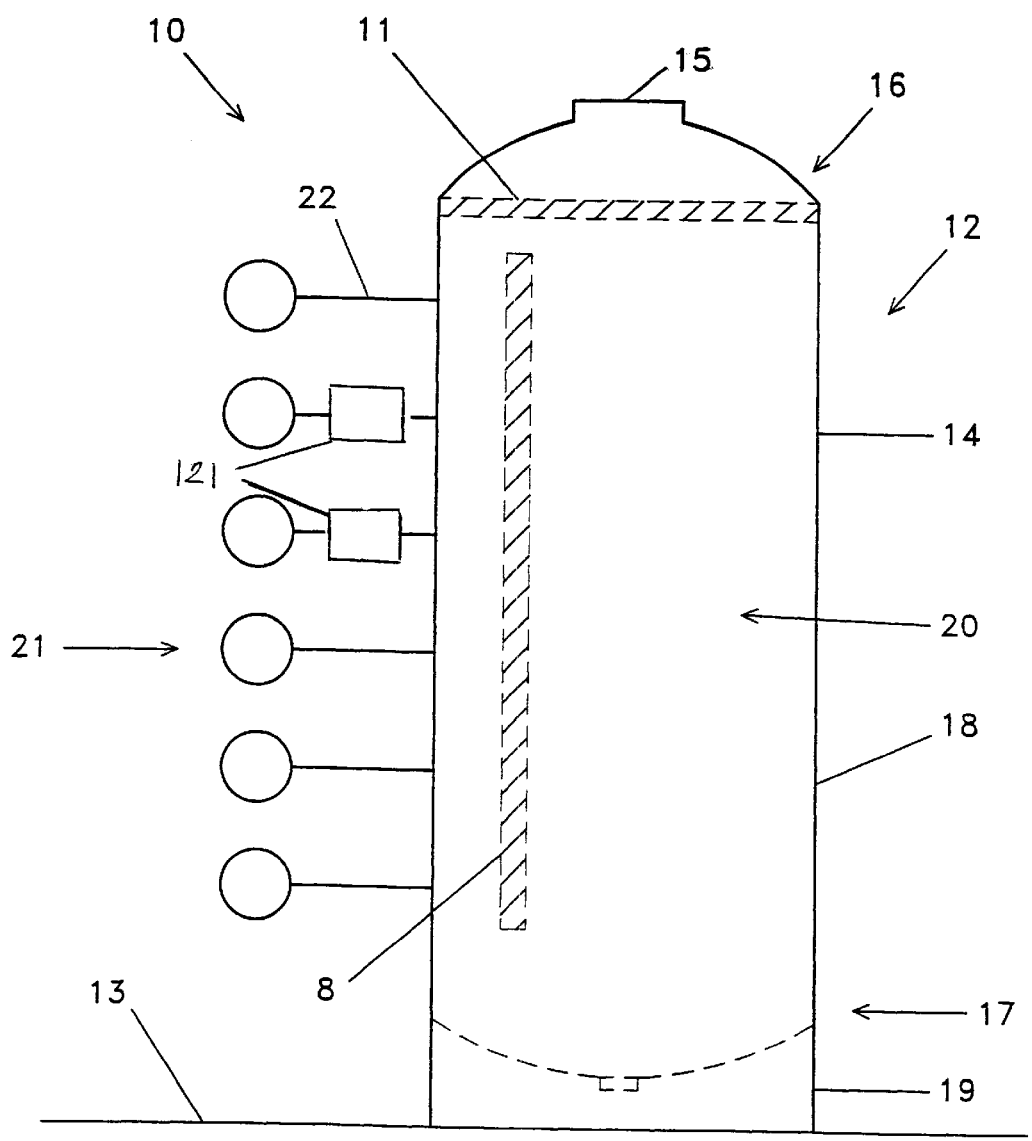
FIG. 1 is a side perspective view of one embodiment of the present invention, including some preferred features indicated in hatched and dotted lines.
Figure 2:
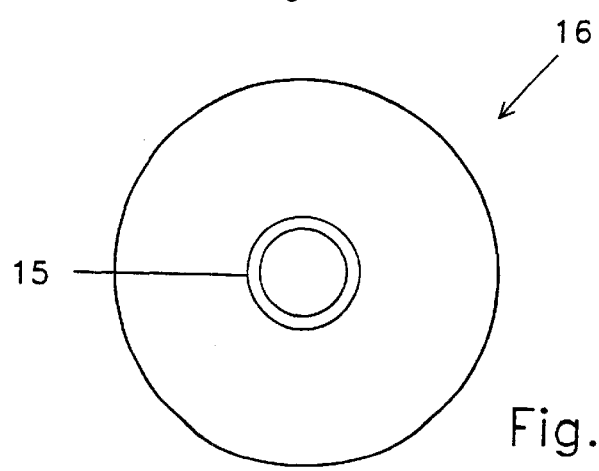
FIG. 2 is a top perspective view of the embodiment depicted in FIG. 1.

Accordingly, a multiple well gas collection system (10) is shown in FIG. 1 having a gas collection element (12). In some embodiments, the multiple well gas collection system may be provided as a multiple well header system having a header element (14). Either of the gas collection system or the header system may be provided as methane coal gas systems. Header element (14) may be provided as a tank or other gas collection element, may define radii which are perpendicular to an outer pressure bearing surface or the like, and may be any apparatus or device for the collection of gas, and in some instances, methane coal gas. The header element (14) may have an upper end (16), a lower end (17), and a sidewall (18) extending from the upper and lower ends and connecting the ends of the header element. Supporting structure for the collection element or header element may include, for example, a support element (19), connected, welded, or otherwise structurally supporting at least the gas collection element (12) or header element (14). A multiple well gas collection system, or in some embodiments a multiple well header system, may provide two or more gas collection elements or header elements, as more particularly described below. The upper and lower ends and the sidewall may structurally form the header element (14), and may also form a volume or an interior chamber (20) of the header element. FIG. 2 depicts a top view of the system of FIG. 1.

Figure 12:
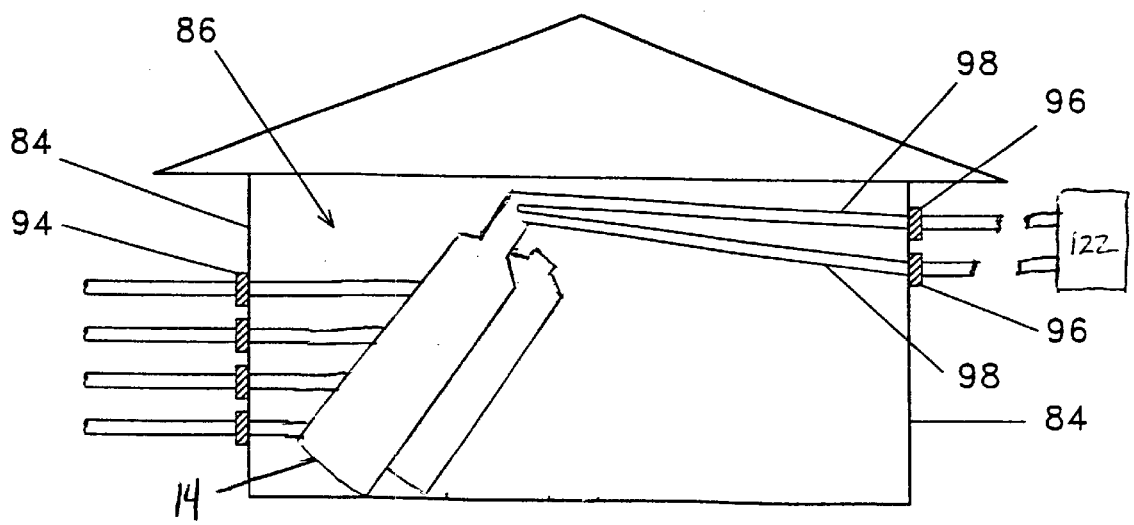
FIG. 12 is a sectional view of a second structure as another embodiment of the present invention.

The header element may be positioned in various configurations relative to ground surface (13) to aid in water vapor separation from collected well fluid. In preferred embodiments, the header element may be positioned substantially vertically positioned from ground surface, as shown in FIG. 1. Alternatively, the header element may be longitudinally positioned from ground surface at an angle, and in some embodiments, positioned at an angle of about 45 degrees from ground surface as shown in FIG. 12. A demist element (11) may also be provided to aid in water vapor separation, and in preferred embodiments, may be provided at an upper end of header element (14) and, in some embodiments, may comprise a plate element. The demist element (11) may be horizontally positioned from a vertical axis of the header element or angularly positioned therefrom.

Broadly described, fluid from multiple wells may be introduced from a plurality of inlet elements (21), each in fluidic communication (22) with the gas collection element (12). Fluidic communication may be understood in the present description as the provision of a flow path for fluid, or a fluidic flow path, for example fluid from coal bed wells, including methane coal gas and entrained water vapor, thereby providing the possibility of fluid flow into the gas collection element. More broadly stated, fluidic communication may provide a state or condition in which a fluid or fluids may be capable of flow from an apparatus, device or element, or from a plurality of such, to another apparatus, device, or element, or a plurality thereof, as may be understood in the field of methane coal gas collection, and may include flow controlled by various flow control elements, such as stop or control inlets or valves, or the like. Furthermore, inlet elements (21) may consist of any element associated with the gas collection element (12) so as to be in fluidic communication therewith, and may comprise pipes, tubes, inlets, valves, or the like, that may serve for fluidic communication.

Figure 3A:
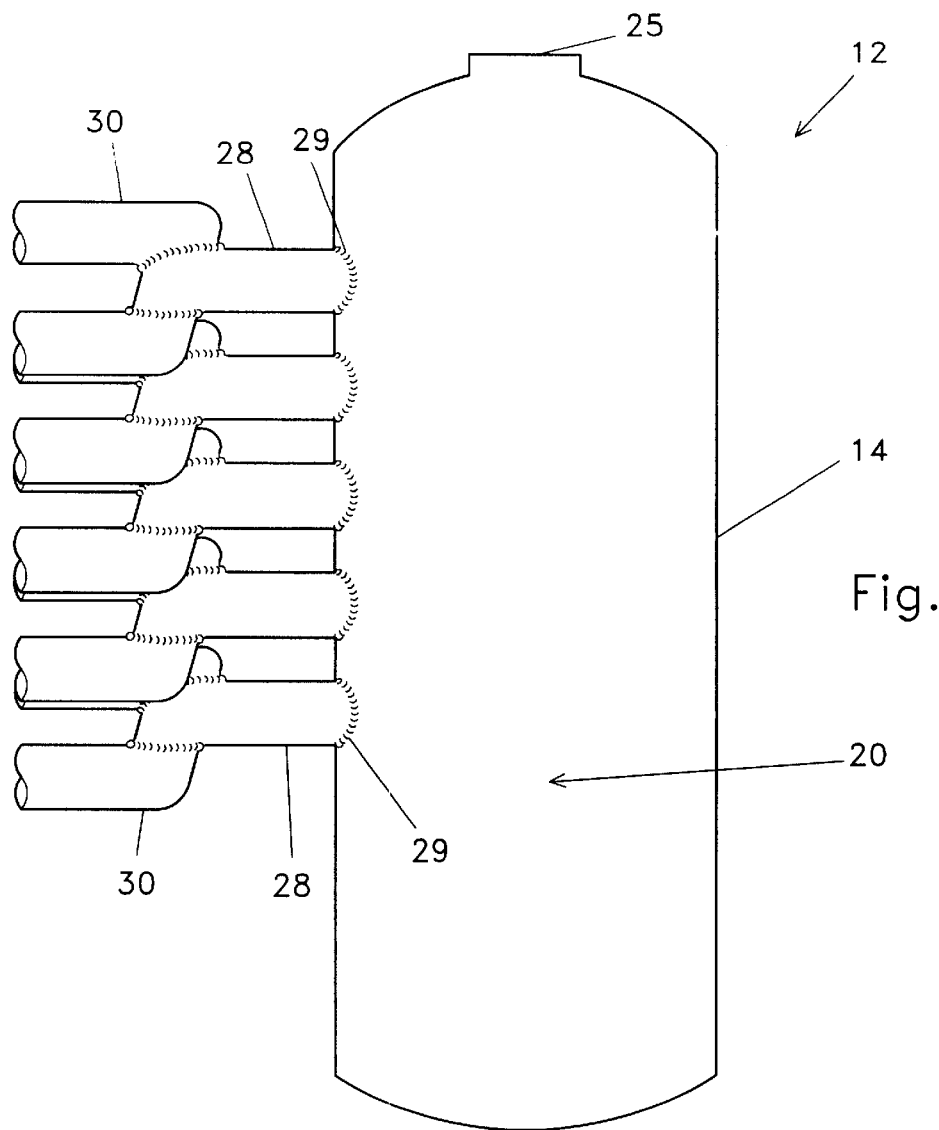
FIG. 3a is a side perspective view of one preferred embodiment of the present invention.
Figure 4A:
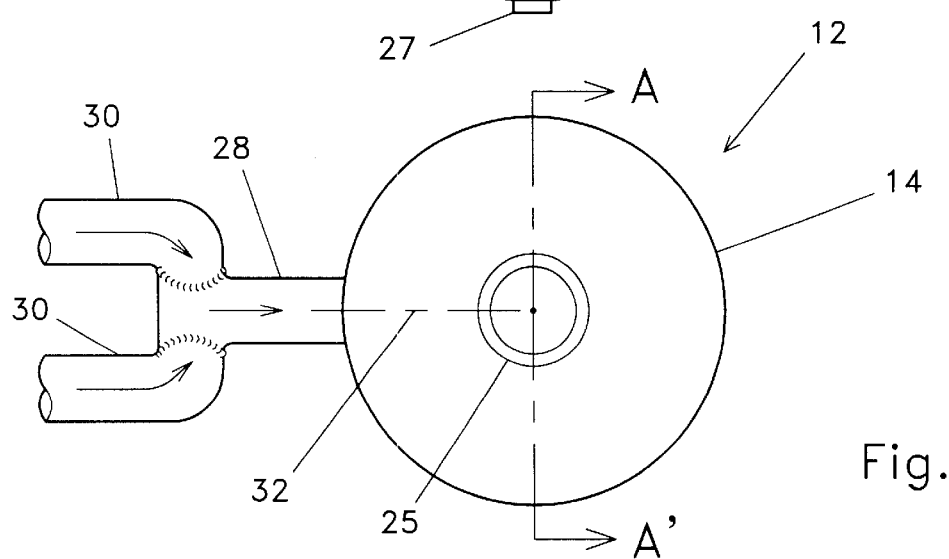
Figure 6:
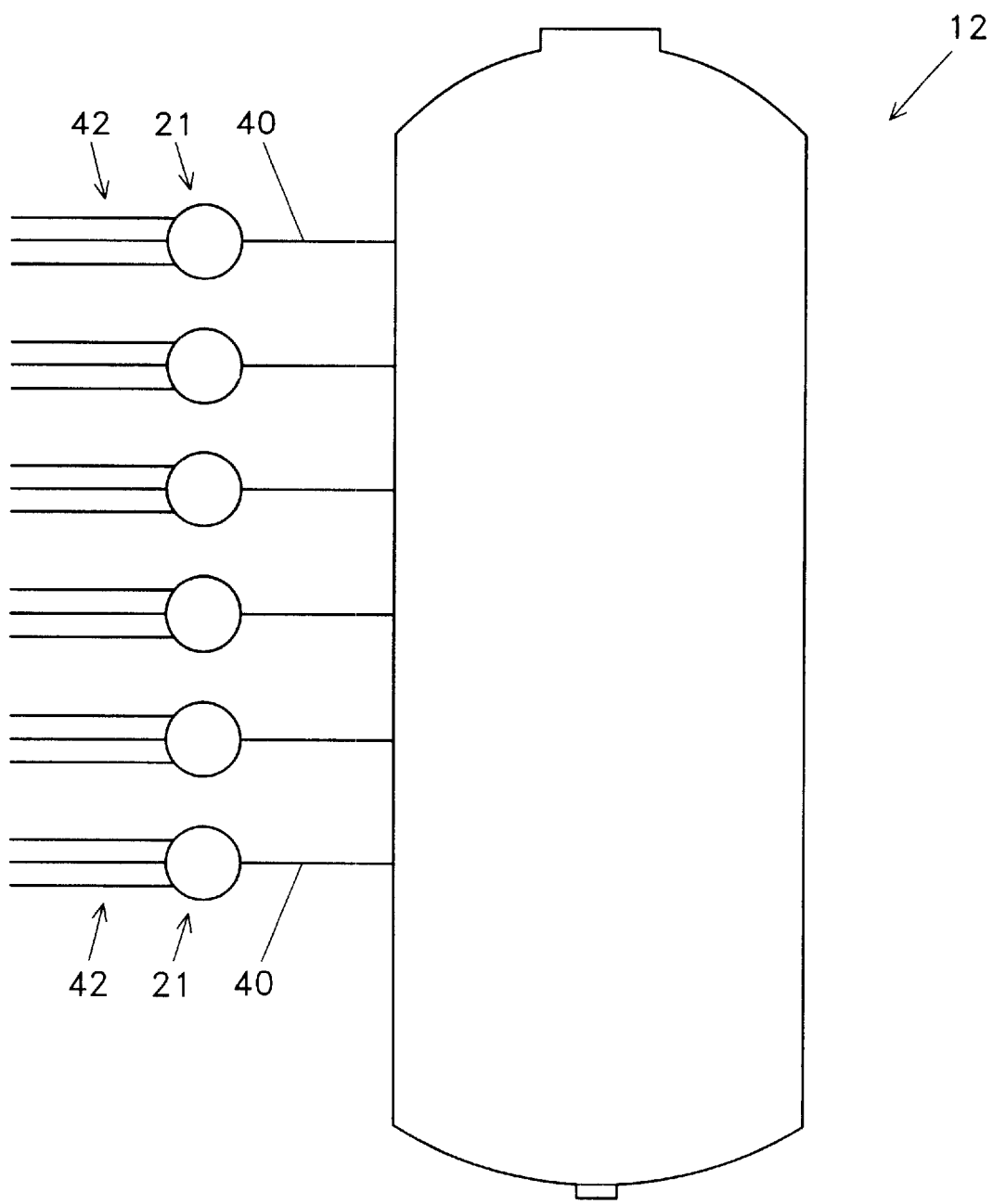

One embodiment of the present invention is depicted in FIGS. 3a and 4a, and more generally shown in FIG. 6. A second and third embodiment is shown in FIGS. 3b and 4b and 3c and 4c, respectively. Each embodiment and its features and characteristics, however, should not be construed as limited to only one embodiment, and particularly, each embodiment may include a combination of features and characteristics from one or more other embodiments. Therefore, common elements and the associated reference numbers may be used in each of the disclosed embodiments.

A plurality of inlets (24) may be provided, and each inlet (26) may be in fluidic communication with the interior chamber (20) through the sidewall (18). Each inlet may be a fluid input, entry or hole, or the like, associated with gas collection element (12) and may provide fluidic communication thereto. Furthermore, an outlet (15), as shown for example in FIG. 1, or a plurality thereof, and in preferred embodiments a gas outlet (25), depicted in FIG. 3, may be provided and may be in fluidic communication with the interior chamber (20). The gas outlet (25) may be provided at approximately an upper end or portion of the header (14), and in some embodiments either responsive to or even positioned through the header, and in fluidic communication with the interior chamber (20). A liquid outlet (27) may also be provided in fluidic communication with the interior chamber, preferably at approximately a lower end (17) of the header element, providing drain capability of separated water vapor from the system.

In preferred embodiments, a plurality of inlet pipes, or the like, may be provided, each inlet pipe in fluidic communication with the interior chamber (20). Each inlet pipe (28) may be fluidically connected to one of the inlets (26) and in fluidic communication with interior chamber (20). In some embodiments, the plurality of inlet pipes may be positioned at least partially within the interior chamber. Inlet valves may be provided as the inlets to control flow to the interior chamber. Control of flow may also be provided by inlet check valves (121). each inlet check valve preferably in fluidic communication with at least two gas source pipes (30).

Figure 3B:
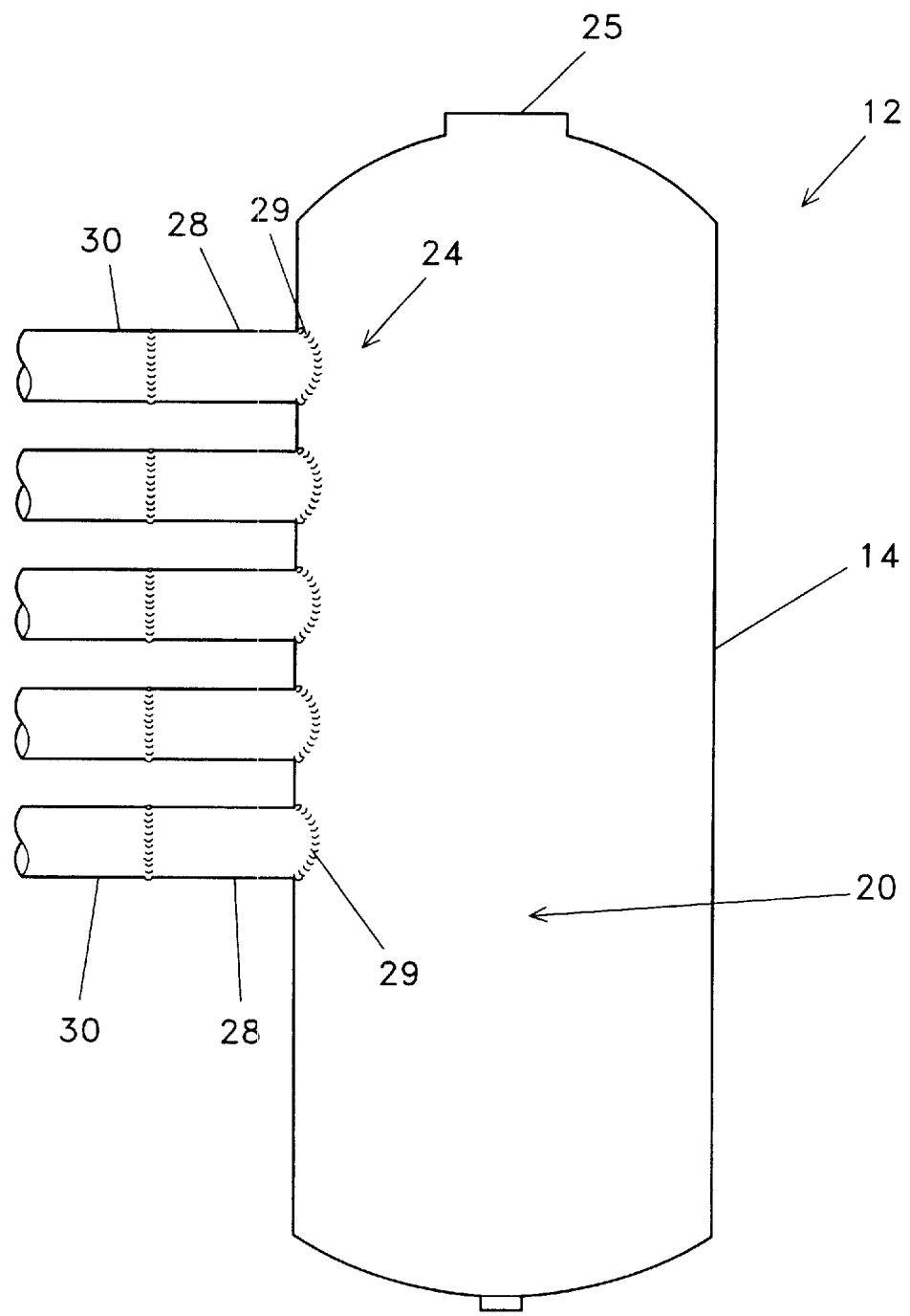
FIG. 3b is a side perspective view of another embodiment of the present invention.
Figure 3C:
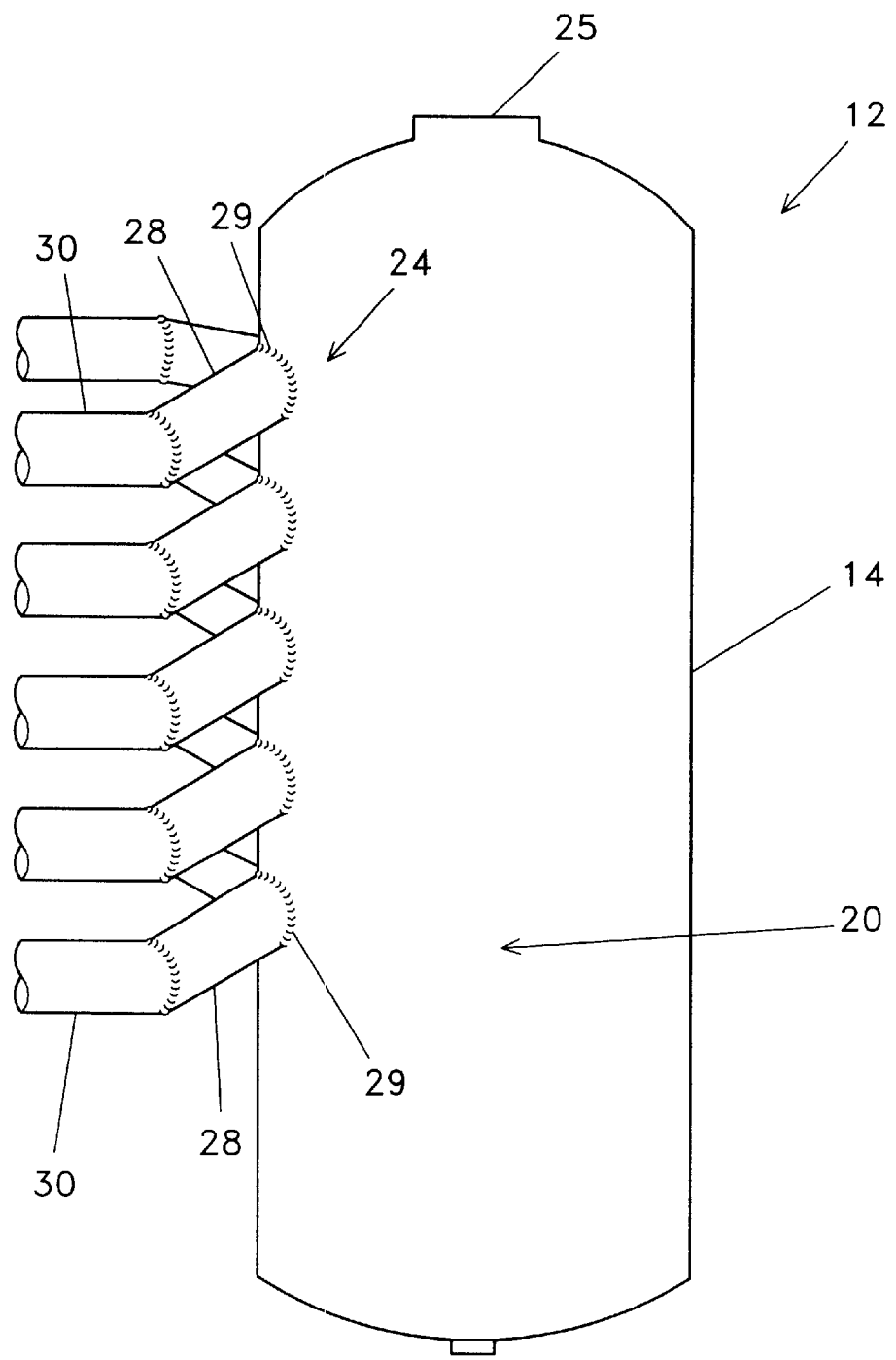
FIG. 3c is a side perspective view of yet another embodiment of the present invention.

Fluidically connected may be understood in the present description as the association of elements to provide a fluidic flow path between elements. Fluidic connection may be provided by some direct or indirect connection, weld, or other structural support. For example, and in preferred embodiments, fluidic connection may be provided between each inlet pipe (28) and the header element (14), and in some embodiments inlet (26). The inlet pipes (28) may also be welded to the header element (14) and as such may present a welded header connection. The plurality of welds (29) may provide fluidic connection between inlet pipe and inlet in accordance with preferred embodiments of the present invention, as shown in the embodiments of FIGS. 3a, 3b, and 3c. Fluidic connection, in accordance with the present invention, may preferably provide greater levels of structural integrity as compared to conventional well gas collection systems, and may minimize cracking or other stress effects, or the like, as further described below.

A plurality of gas source pipes, or the like, may also be provided. One configuration of gas source pipes, inlet pipes and inlets in accordance with the present invention is depicted in FIGS. 3a and 4a. Two other configurations of gas source pipes, inlet pipes and inlets in accordance with the present invention is depicted in FIGS. 3b and 4b and 3c and 4c, respectively. Each gas source pipe (30) may be fluidically connected to one of the inlet pipes (28) and in fluidic communication with the interior chamber (20). Each inlet pipe (28), in some embodiments, may be provided as a t-pipe or t-connection pipe, or may be provided in any configuration, such as a straight pipe, or the like, as shown in the embodiments of FIGS. 3b, 4b, 3c and 4c. In the embodiments of FIGS. 3a and 4a, at least two gas source pipes may be fluidically connected to each of the t-pipes or t-connection pipes. Source pipes (30) may each fluidically connect a well, and in some embodiments a methane coal gas well, and potentially including wells physically remote from the header element, to the header element (14). Source pipes from each individual well may be provided in the field as mutually substantially parallel with other source pipes, above or below ground, such that the traversal of source pipes from well to gas collection or header system may be conveniently located for monitoring and maintenance, or the like.

A plurality of gauge elements may further be provided as part of the collection or header system, each gauge being fluidically responsive to a fluid within the system. In preferred embodiments, each gauge element may be fluidically responsive to a fluid within one of the plurality of gas source pipes and may be fluidically connected to one of the source pipes. The gauge elements could comprise any known sensing device and may include flow meters and multimeters.

Each inlet element (21) may be located at a respective location of the gas collection element (12), as exemplified in FIGS. 1 and 6. Each inlet element, in some embodiments, may be positioned or otherwise located at a singular location of the gas collection element, and preferably, may be located at a singular and sequential location. In preferred embodiments the location of each of the inlet elements may be a vertically sequential location of the gas collection element. In the embodiments of FIGS. 3a, 4a and 3b and 4b, and in the cross-section of FIG. 5, each inlet (26) may be located at a singular and sequential location of the sidewall (14), and in preferred embodiments, located at a vertically sequential location.

Embodiments of the present invention may provide positioned inlet elements at locations of the gas collection element or positioned inlets at locations of the sidewall of the header element. Embodiments of the present invention may provide paired inlets or inlet elements. Each inlet or inlet element may be positionally paired with another or second inlet or inlet element at a location of the sidewall (14) or gas collection element (12). Further, each paired inlet or inlet element may be horizontally positionally paired, or more generally longitudinally paired with a second paired inlet or inlet element. As such they may even present longitudinally paired inlets or gas source pipes. FIGS. 3a and 4a and 3c and 4c exemplify such positional pairing. Embodiments of the present invention may also provide a first portion of inlet elements positioned along a first vertical and a second portion of inlet elements along a second vertical of the gas collection element. The angular position of each vertical, and the first and second portion of inlet elements, may be angularly positioned, and in some embodiments, may be at least about 45 degrees, at least about 90 degrees, and at least about 180 degrees of angular position between each vertical and portions of inlet elements. Inlets may be likewise positioned along first and second vertical of the sidewall of the header element. FIGS. 8a through 8d provide variously positioned inlets (52) in accordance with the present invention.

In accordance with preferred embodiments, and as generally shown in FIG. 6, each of the inlet elements (21) may comprise a merged fluidic flow path (40) in fluidic communication with the gas collection element (12). Multiple inlets may also provide a directly merged flow such that the flows would, if they continued uninterrupted, impinge upon each other without any need for a separate directing element or wall. Merged fluidic flow path (40) may provide a merged flow path for a plurality of fluids (42) introduced or otherwise provided to inlet elements (21). Accordingly, a flow path of fluidic communication may be provided from each of the inlet elements (21), including merged fluidic flow path (40), to gas collection element (12). Each inlet element may, in preferred embodiments, comprise a t-pipe or t-connection pipe. FIGS. 3a and 4a show a preferred embodiment in which each inlet pipe (28) may provide a merged fluidic flow path in fluidic communication with the interior chamber (20) of header element (14) for fluid potentially flowing from or through respective source pipes (30). A flow path of fluidic communication may be provided from each source pipe (30), through each inlet pipe (28), and each inlet (26), to header element (14), and specifically, interior chamber (20).

As previously mentioned, the structural integrity of the system is of importance to ensure functionality and reliability. Therefore, inlet elements (21), and in some embodiments the inlet pipes (28), each in fluidic communication with the gas collection element or the interior chamber, may each be substantially coincident with a radius of the gas collection element or header element. As such the inlets may present substantially radially coincident inlets. A longitudinal axis of each inlet element may preferably be substantially coincident with a radius of the gas collection element. In preferred embodiments, the radius may be substantially perpendicular or orthogonal to a central axis of the gas collection element.

Figure 5:
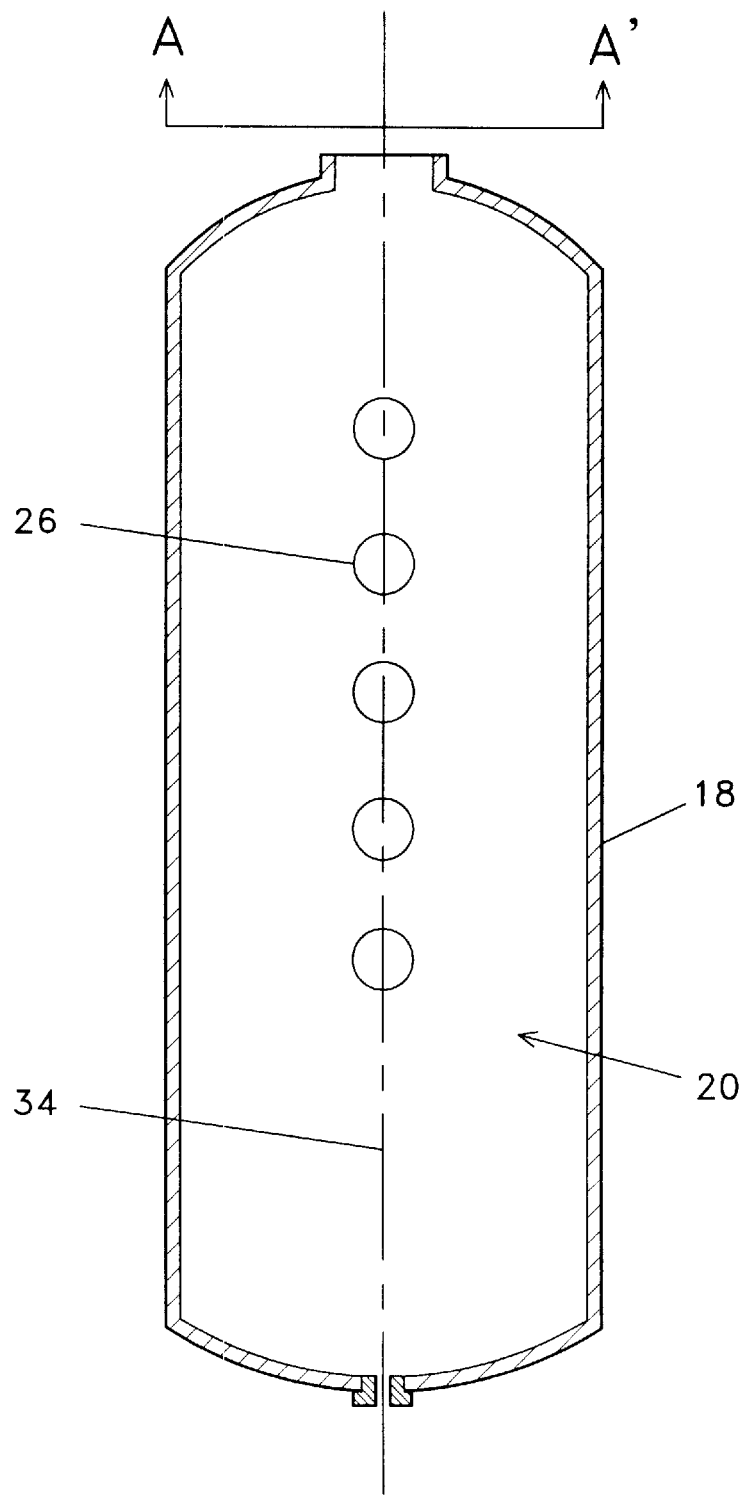
FIG. 5 is a cross sectional view along A–A' of the embodiment depicted in FIG. 4a, and may represent other embodiments of the present invention.

FIG. 4a shows one embodiment wherein inlet pipe (28), and in preferred embodiments other inlet pipes not shown in this view, and in preferred embodiments a longitudinal axis of the inlet pipe,maybe substantially coincident with a radius (32) of header element (14). Radius (32) may be a radius associated with a central, longitudinal or a symmetrical axis (34) of gas collection element (12), or header element (14), as depicted in FIG. 5. Provision of the inlet elements or inlet pipes substantially coincident with a radius of the gas collection element or header element may provide a more structurally robust fluidic connection or weld between each inlet element and the gas collection element, and in preferred embodiments, between each inlet pipe and the inlet or header element. One potential result of a substantially coincident inlet element or inlet pipe is that the fluidic connection or weld may require less of a cross-sectional area for which fluidic connection may be needed with regard to the gas collection element, and in some embodiments the sidewall of the header element. Additionally, less fluidic connection or weld is required for a substantially coincident inlet element or inlet, thereby providing a more structurally sound connection or weld.

Other embodiments of substantially coincident inlet elements or inlets are shown in FIGS. 3b and 4b and 3c and 4c, respectively. Each inlet pipe (28) may be fluidically connected to one of the inlets (24) and may be in fluidic communication with the interior chamber (20). Each inlet pipe, furthermore, may comprise a longitudinal axis that is substantially coincident with a radius (32) of the header element. In preferred embodiments, the radius (32) may be substantially perpendicular to a central axis of the header element.

Figure 7:
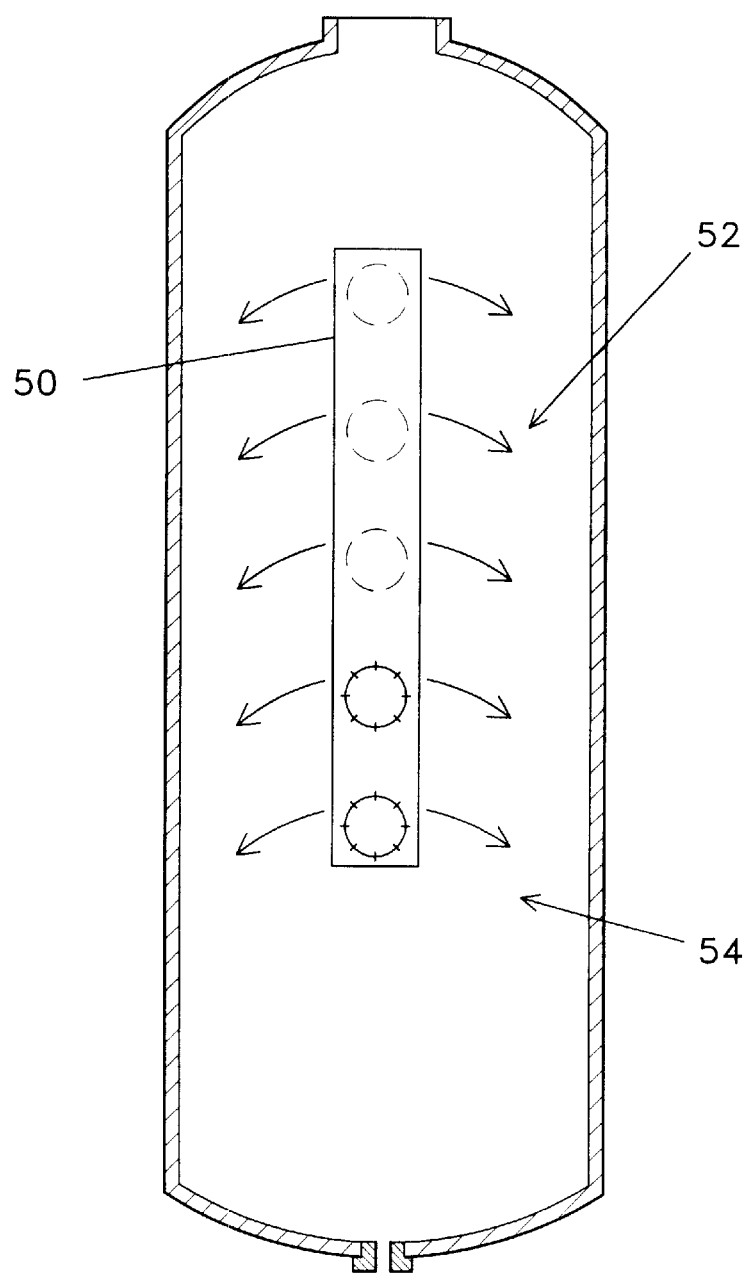
FIG. 7 is a cross-sectional view of one embodiment of the present invention.
Figure 8A:
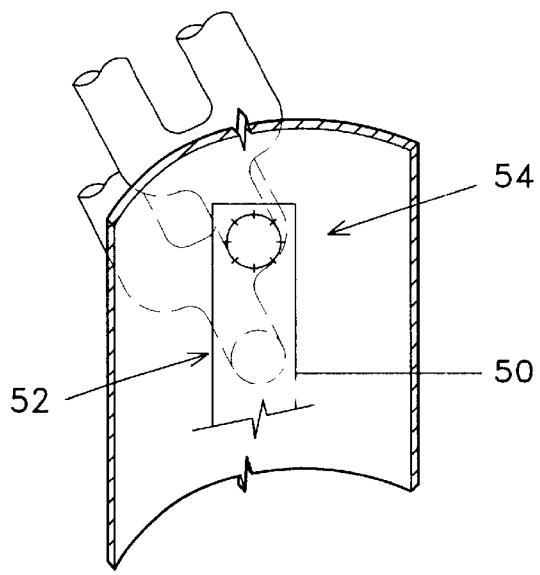
FIGS. 8a through 8d are cross-sectional views of alternative embodiments of that depicted in FIG. 7.
Figure 8B:
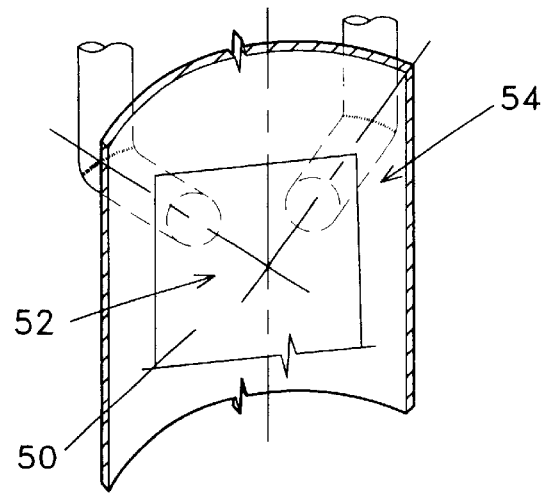
Figure 8C:
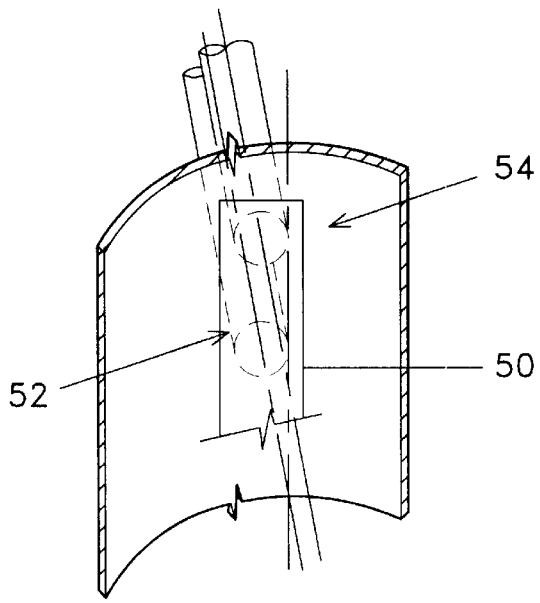
Figure 8D:
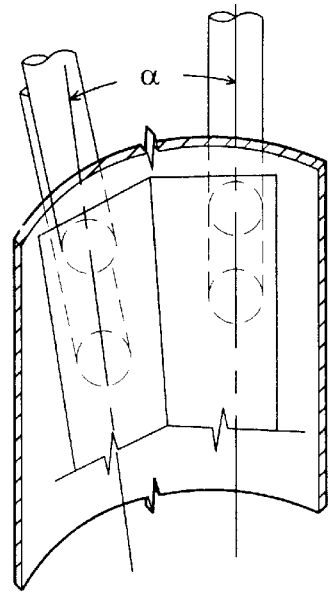

To further aid in gas and vapor separation a baffle element (8), as shown in one embodiment in FIG. 1, may also be provided, and in preferred embodiments, may be equally responsive to the plurality of inlet elements (21) that are in fluidic communication with the gas collection element (12). A baffle element, in some embodiments, may be provided substantially within the interior chamber (20) of the header element (14), equally responsive to the plurality of inlets (24) shown in FIGS. 3, 4 and 5. FIG. 7 discloses in cross-section one embodiment of the present invention providing a header element with a baffle element (50) within or substantially within the interior chamber (54) and equally responsive to the plurality of inlets (52) that are in fluidic communication with the interior chamber. Equally responsive may be understood in the present description as the association of the baffle element to the inlet elements or inlets and the flow of fluid therefrom such that given a relatively equal flow or non-flow from each of the inlet elements or inlets, the flow of fluid from each inlet element or inlet will interact with the baffle element in approximately the same manner or may alternatively achieve the same result. The embodiment of FIG. 7 may be incorporated with any of the disclosed embodiments of the present invention, including, but not limited to, those embodiments incorporating merged fluidic flow paths of the inlet elements or inlet pipes, embodiments incorporating inlet elements and inlet pipes substantially coincident with a radius of the gas collection element or the header element, and embodiments incorporating sequenced, positioned, and positionally paired and horizontally positionally paired inlets. FIGS. 8a to 8d show cross-sections of at least a few of these disclosed embodiments.

Fluid introduced into the gas collection element may be processed in a number of ways. As but a few examples, fluid may be at least partially separated into liquid and gas, and in accordance with some embodiments of the present invention, fluid may be at least partially mixed within the gas collection element. Fluid may also be at least partially swirled within the gas collection element. In accordance with some embodiments, fluid may interact at least with the equally responsive baffle element. In preferred embodiments, the baffle element may be positioned in an orientation corresponding to the plurality of inlets such that fluid introduced from the plurality of inlets may be at least partially mixed within, at least partially swirled within, or at least partially separated into liquid and gas within said interior chamber, or any combination thereof or the like.

Methods of gas collection may provide the step of at least partially processing well fluid within the gas collection element or at least partially obstructing well fluid within the collection element. These steps may, in accordance with preferred embodiments, provide at least partially separating well fluid into liquid and gas with the gas collection element, at least partially mixing well fluid within the gas collection element, or at least partially swirling well fluid with the gas collection element.

Figure 9:
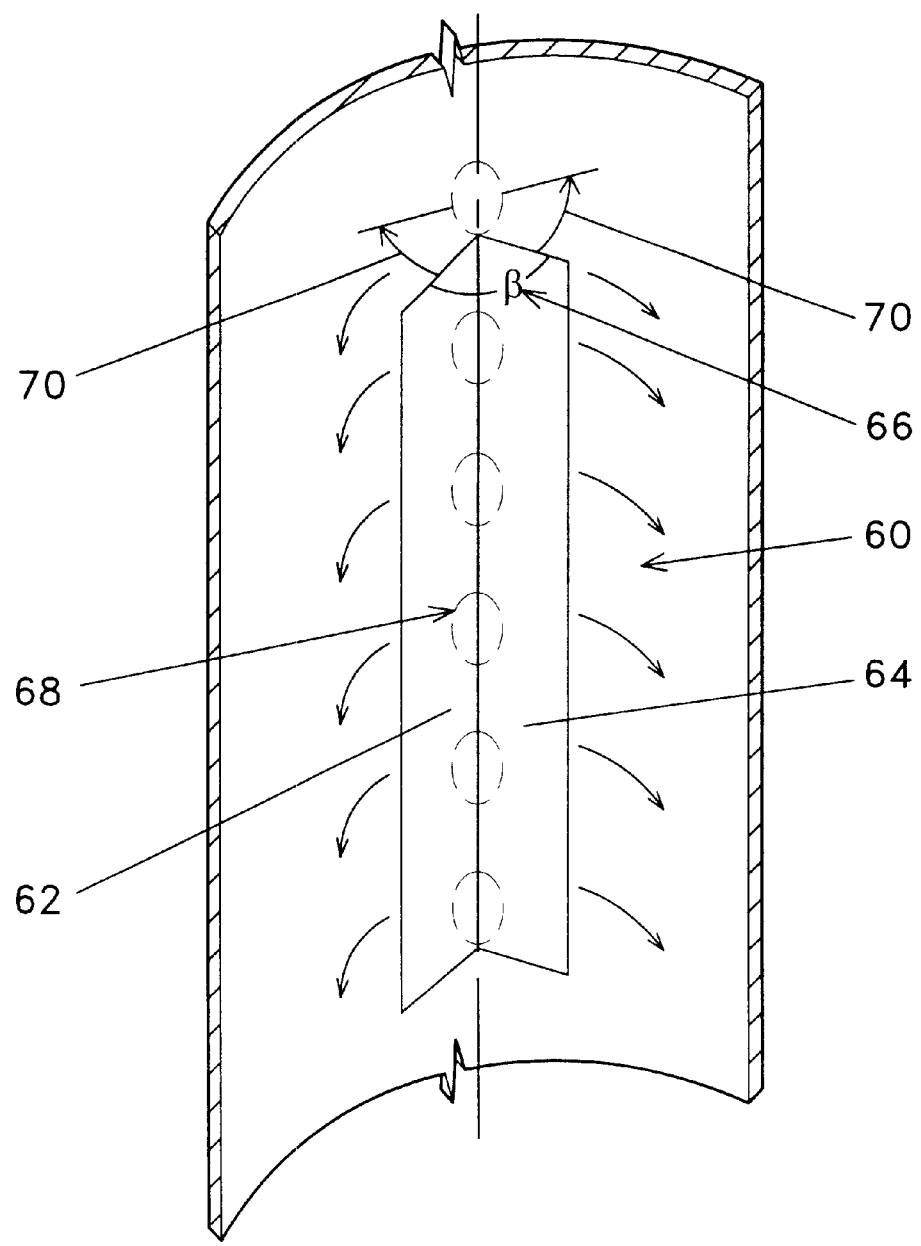
FIG. 9 is a cross-sectional view of another alternative embodiment of that depicted in FIG. 7.

The baffle element of the present invention may be provided in many different configurations, and in preferred embodiments, provided in configurations so as to be equally responsive to the inlet elements or inlets. One configuration is an angled baffle element, one embodiment of which is shown in the cross-section of FIG. 9. Angled baffle element (60) may be provided as a first planar portion (62) and a second planar portion (64) having an orientation between the first and second planar portions and an angle (66). Preferred embodiments may provide the first and second portions each having a width of at least about 4 inches, at least about 6 inches, or at least about 8 inches. In accordance with a preferred embodiment, the orientation of the first and second planar portions may be configured to an orientation relative to the inlet elements or inlets, and preferably may be oriented at an angle (70) of about 45 degrees from the inlet elements, or inlets (68), as shown in FIG. 9. Another configuration may provide the baffle element as a plurality of baffle elements, and each baffle element may be equally responsive to the inlet elements or inlets.

Figure 10:
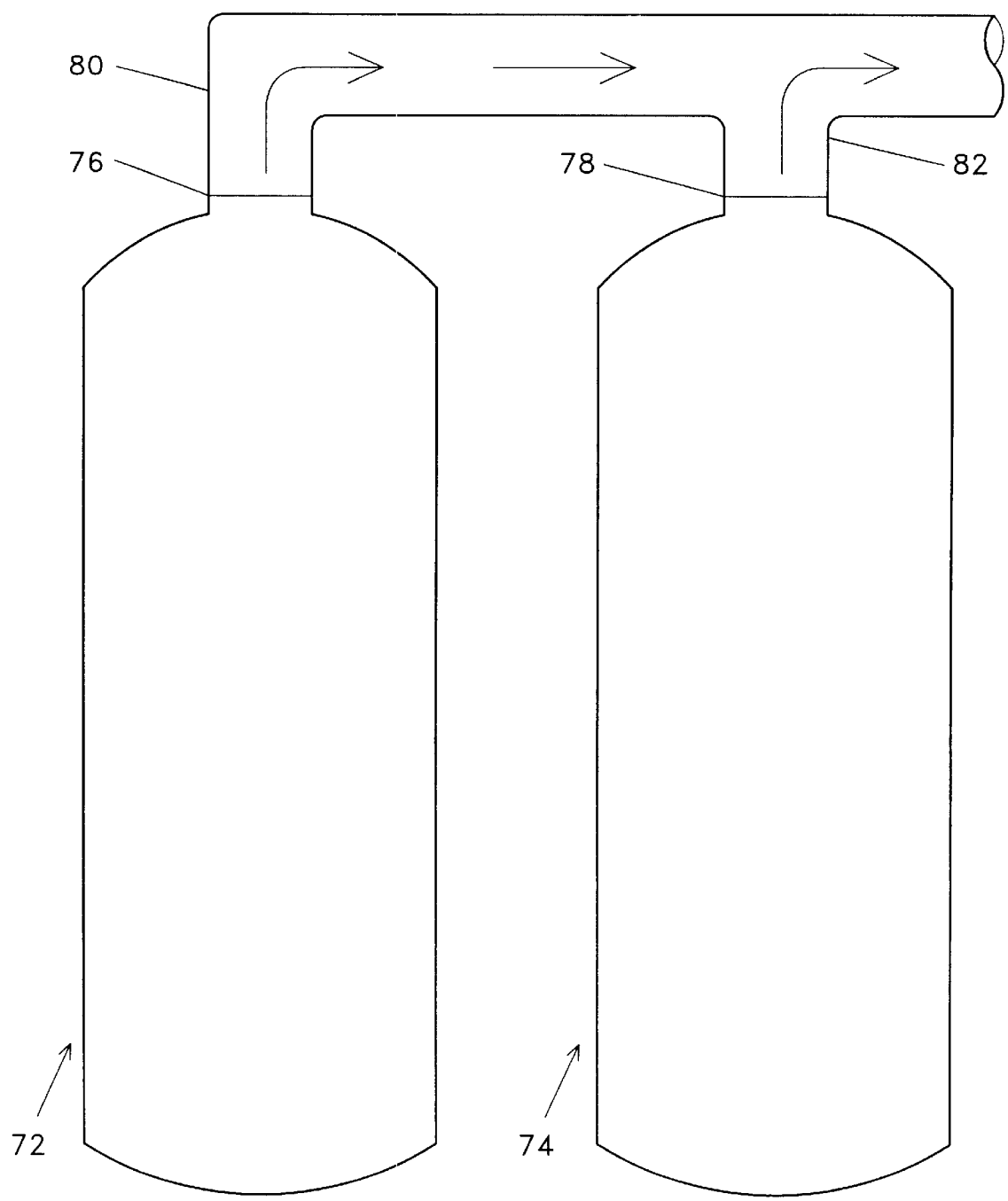
FIG. 10 is a side perspective view of a particular embodiment of the present invention, illustrating, in part, multiple gas collection systems and outlet features.

Embodiments of the present invention may further provide gas collection systems and well header systems incorporating a plurality of gas collection elements or header elements. FIG. 10 depicts one embodiment wherein two header elements (72) and (74) are provided each having a gas outlet (76), (78) and a gas outlet pipes (80), (82) fluidically connected to each gas outlet. In accordance with preferred embodiments, the gas outlets of each header element may be fluidically connected and the gas outlet pipes may provide a merged fluidic flow path for the gas outlets.

Figure 11:
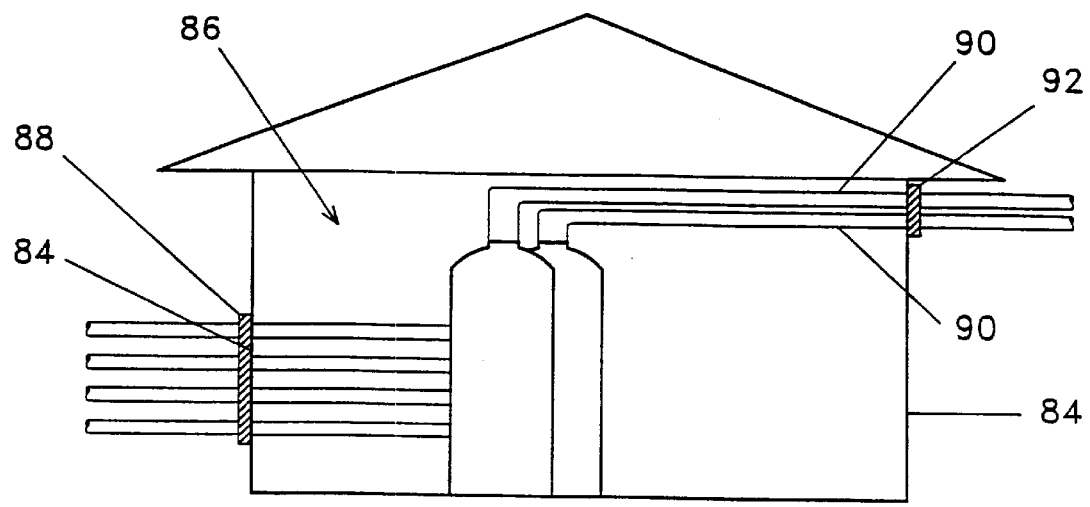
FIG. 11 is a sectional view of a structure as one embodiment of the present invention.

Furthermore, the present invention may provide system or header buildings to protect or contain the systems, or the like. One embodiment may provide a structure substantially encompassing the collection or header element or elements, as shown in FIGS. 11 and 12. The structure may provide at least one wall (84) defining a interior structure volume (86) such that the gas collection system or header system is substantially within the interior structure volume, as shown in FIGS. 11 and 12. Furthermore, and in accordance with embodiments of the present invention a gas source pipe inlet (88), as shown in FIG. 11, or a plurality of gas source pipe inlets (94), as shown in FIG. 12, are positioned through the at least one wall (84) such that one or a plurality of gas source pipes may extend into the interior structure volume (86) through the wall (84). The present invention may also provide a gas pipe outlet (92) or a plurality of gas pipe outlets (96), wherein one or a plurality of gas outlet pipes (90), (98) may extend to an exterior of the wall (84) through the pipe outlet or outlets.

Processing facilities may be provided to further process the collected gas from the collection or header system. The present invention further provides for a methane processing system (122) or systems in fluidic communication with the gas outlet of the collection or header system. Preferred embodiments of the present invention may provide gas outlet pipes, of which FIGS. 10, 11 and 12 provide several embodiments, that may be fluidically connected to the gas outlet or outlets of the gas collection or head system and the processing system. Other gas processing systems may be envisioned within the broad scope of the presently disclosed invention.

Methods of well gas collection are also disclosed. Accordingly, one embodiment of the present invention may provide a method of well gas collection as providing the steps of providing a gas collection element, supplying well fluid from a plurality of wells to the gas collection element, merging well fluid from the plurality of wells, flowing merged well fluid into the gas collection element, and collecting gas within the gas collection element. Merging well fluid from a plurality of wells prior to flowing the fluid into the gas collection element may provide a more efficient method of gas collection.

In accordance with one embodiment of the present invention, flowing the merged well fluid into the collection element may be accomplished, in preferred embodiments, by flowing merged well fluid singularly and sequentially into the collection element. Other embodiments may provide for flowing merged well fluid vertically sequentially into the collection element, and further flowing the merged well fluid along a first and second vertical of the collection element. The step of flowing well fluid into the collection element may providing flowing fluid through a plurality of inlet elements fluidically connected to the gas collection element, wherein in some embodiments the inlet elements may be paired or horizontally paired inlet elements, and the method may further provide the step of merging the well fluid from a plurality of wells through the inlet elements. Merging the well fluid from a plurality of wells may comprise merging through a plurality of t-connection pipes or t-pipes. In accordance with particular embodiments, flowing the merged well fluid into the collection element may provide flowing well fluid substantially radially into the collection element.

Figure 4B:
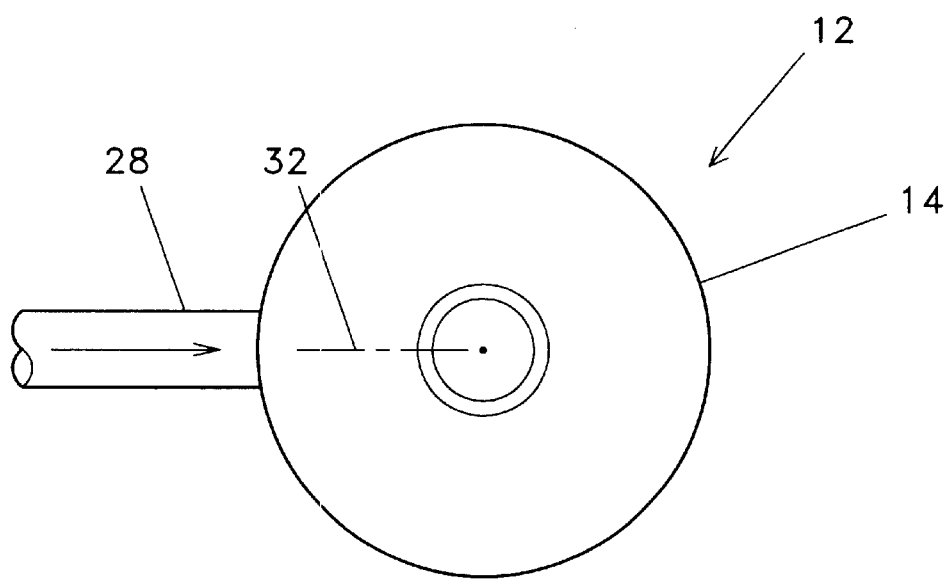
FIG. 4b is a top perspective view of the embodiment depicted in FIG. 3b.
Figure 4C:
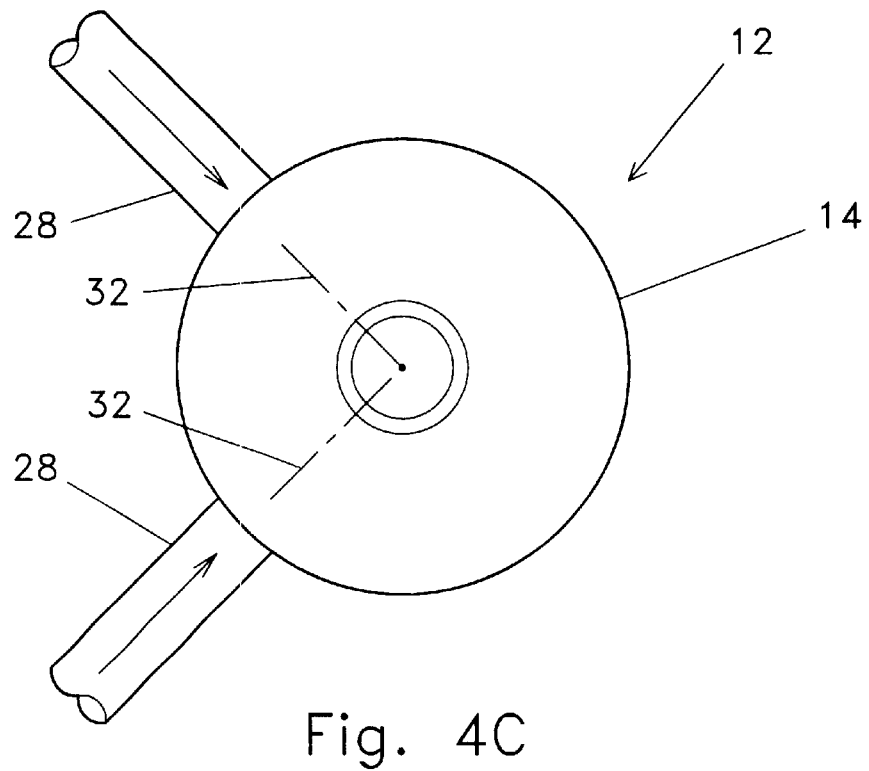
FIG. 4c is a top perspective view of the embodiment depicted in FIG. 3c.

Another embodiment of the present invention may provide a method of well gas collection as providing the steps of providing a gas collection element, supplying well fluid from a plurality of wells to the gas collection element, flowing well fluid substantially radially into the gas collection element, and collecting gas within the gas collection element. Flowing well fluid substantially radially into the gas collection element may provide a more efficient method of gas collection and may provide a more structurally robust gas collection system. The step of flowing well fluid substantially radially into the gas collection element may also provide the step of flowing well fluid substantially coincident with a radius of the gas collection element. The step may be most easily shown in FIGS. 4a, 4b, and 4c, wherein the provision of flowing from inlet pipe (28) would be provide flowing substantially coincident with radius (32). The step of flowing substantially coincidental with a radius of the collection element may further provide flowing well fluid along a longitudinal axis of the plurality of inlet elements substantially coincident with the radius (32) of the collection element, as shown in FIGS. 4a, 4b, and 4c. Further, the flowing of well fluid along a longitudinal axis of the inlet elements may provide for flowing well fluid substantially perpendicular to a central axis of the gas collection element, also shown in FIGS. 4a, 4b, and 4c.

In accordance with one embodiment of the present invention, flowing the well fluid substantially radially into the gas collection element may provide merging well fluid from a plurality of wells and flowing the merged well fluid into the collection element. Flowing the merged well fluid or unmerged well fluid substantially radially into the collection element may be accomplished, in preferred embodiments, by flowing well fluid singularly and sequentially into the collection element. Other embodiments may provide for flowing well fluid vertically sequentially into the collection element, and further flowing the well fluid along a first and second vertical of the collection element, and flowing along a first and second vertical angularly positioned at least about 45 degrees, at least about 90 degrees, and at least about 180 degrees. The step of flowing well fluid substantially radially into the collection element may provide for flowing fluid through a plurality of inlet elements fluidically connected to the gas collection element, whereby in some embodiments the inlet elements may be paired or horizontally paired inlet elements, and the method may further provide the step of merging the well fluid from a plurality of wells through the inlet elements.

Another embodiment of the present invention may provide a method of well gas collection as providing the steps of providing a gas collection element, supplying well fluid from a plurality of wells to the gas collection element, flowing well fluid into the gas collection element, at least partially obstructing the well fluid with the gas collection element, and collecting gas within the gas collection element, wherein the step of at least partially obstructing may be achieved equally responsive to the step of flowing well fluid into the collection element. The step of at least partially obstructing as being achieved equally responsive to the step of flowing well fluid may enhance the gas separation efficiency as compared to prior methods of well gas separation.

In accordance with one embodiment, flowing the well fluid into the collection element may be accomplished, in preferred embodiments, by merging well fluid from a plurality of wells and flowing merged well fluid into the collection element. Flowing the merged or unmerged well fluid may be provided by flowing singularly and sequentially into the collection element. Other embodiments may provide for flowing merged or unmerged well fluid vertically sequentially into the collection element, and further flowing the well fluid along a first and second vertical of the collection element. The step of flowing well fluid into the collection element may provide for flowing fluid through a plurality of inlet elements fluidically connected to the gas collection element, wherein in some embodiments the inlet elements may be paired or horizontally paired inlet elements, and wherein flowing well fluid through the plurality of inlet elements may provide merging well fluid from a plurality of wells through the inlet elements. In accordance with particular embodiments, flowing the merged well fluid into the collection element may provide for flowing well fluid substantially radially into the collection element.

As previously mentioned, embodiments of the present invention may provide a method of well gas collection providing the step of at least partially processing well fluid within the gas collection element. Additional embodiments, furthermore, may provide the steps of at least partially processing well fluid within the collection element and the step of at least partially obstructing the well fluid with the collection element to be performed at least partially co-positionally. The steps may be most easily understood from the FIGS. 7 and 9. As fluid is introduced or flowed into the collection element, the fluid is at once partially obstructed by the baffle elements (50) and (64), respectively. The baffling also functions to at least partially process the fluid, as the fluid is at least partially separated into liquid and gas, at least partially mixed, or at least partially swirled within the collection element, or a combination thereof. Due to the co-positional, and in some embodiments co-temporal, aspects of the two steps, the step of at least partially processing well fluid within the collection element may be considered to comprise the step of at least partially obstructing well fluid within the collection element. Further, the step of at least partially obstructing well fluid within the collection element may be considered to comprise the processing steps of at least partially separating into liquid and gas, at least partially mixing, or at least partially swirling within the collection element, or a combination thereof.

Other embodiments may provide at least partially obstructing well fluid by at least partially angularly obstructing well fluid with the collection element, as may be shown in FIG. 9. The step of at least partially obstructing may be, in preferred embodiments, performed by a baffle element within an interior volume of the collection element positioned in an orientation corresponding to a plurality of inlet elements fluidically connected to the interior volume such that the step of at least partially obstructing is achieved equally responsive to the step of flowing, as shown in FIG. 9. The step of at least partially obstructing well fluid within the collection element may be performed by a baffle element comprising a first and second planar portion each configured to an orientation of about a 45 degree angle corresponding to a plurality of inlet elements, also shown in FIG. 9. Additional embodiments may provide the step of at least partially obstructing well fluid within the collection element performed by a plurality of baffle elements.

As can be easily understood from the foregoing, the basic concepts of the present invention may be embodied in a variety of ways. It involves both multiple well gas collection techniques as well as devices to accomplish multiple well gas collection. In this application, the multiple well gas collection techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims available.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "inlet" should be understood to encompass disclosure of the act of "inletting"—whether explicitly discussed or not—and, conversely, were there effectively disclosure of the act of "inletting", such a disclosure should be understood to encompass disclosure of an "inlet" and even a "means for inletting." Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement, if any, filed with the application are hereby appended and hereby incorporated by reference. However, as to each of the above, to the extent that such information or statements incorporated by reference might be considered inconsistent with the patenting of the disclosed inventions, such statements are expressly not to be considered as made by the Applicant.

Thus, the Applicant should be understood to have support to claim at least: i) each of the devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

I claim:

1. A multiple well gas collection system, comprising:
   a. a gas collection element defining radii;
   b. a plurality of substantially radially coincident inlet elements each in fluidic communication with said gas collection element; and
   c. an equal response baffle element having at least one surface oriented substantially perpendicular to a fluidic flow path from an inlet and wherein said baffle element is positioned in an orientation corresponding to said plurality of inlet elements wherein said baffle element is equally responsive to said inlet elements.

2. A multiple well header system as described in claim 1 wherein said substantially radially coincident inlet pipes are substantially perpendicular to a central axis of said header element.

3. A multiple well header system as described in claim 1 wherein each inlet element comprises a paired inlet element.

4. A multiple well header system as described in claim 3 wherein each paired inlet element comprises a longitudinally paired inlet element.

5. A multiple well header system as described in claim 4 wherein a first portion of said inlet elements are positioned along a first vertical of said gas collection element and a second portion of said inlet elements are positioned along a second vertical of said gas collection element.

6. A multiple well header system as described in claim 5 wherein said first vertical is angularly positioned from said second vertical at an angle selected from the group consisting of at least about 45 degrees, at least about 90 degrees, and at least about 180 degrees.

7. A multiple well header system, comprising:
   a. a header element having an upper end and a lower end and a sidewall connecting said upper end and said lower end, wherein said upper and lower ends and said sidewall surround an interior chamber;
   b. a plurality of inlets in fluidic communication with said interior chamber through said sidewall;
   c. an equal response baffle element within said interior chamber having at least one surface oriented substantially perpendicular to a fluidic flow path from an inlet and wherein said baffle element is positioned in an orientation corresponding to said plurality of inlets wherein said baffle element is equally responsive to said inlets;
   d. a plurality of inlet pipes fluidically connected to one of said inlets and in fluidic communication with said interior chamber;
   e. a plurality of gas source pipes each fluidically connected to one of said inlet pipes; and
   f. a gas outlet responsive to said header element and in fluidic communication with said interior chamber.

8. A multiple well header system as described in claim 7 wherein said inlet pipes comprise paired inlet pipes.

9. A multiple well header system as described in claim 8 wherein said inlet pipes comprise longitudinally paired inlet pipes.

10. A multiple well header system as described in claim 7 wherein said inlet pipes comprise substantially radially coincident inlet pipes.

* * * * *